United States Patent [19]
Brown

[11] Patent Number: 6,083,099
[45] Date of Patent: Jul. 4, 2000

[54] AIR TEMPERATURE CONTROL AND DISTRIBUTION MODULE

[75] Inventor: David Geoffrey Brown, Witney, United Kingdom

[73] Assignee: Rover Group Limited, Warwick, United Kingdom

[21] Appl. No.: 09/144,395

[22] Filed: Aug. 31, 1998

[30] Foreign Application Priority Data

Sep. 20, 1997 [GB] United Kingdom .................... 9719966

[51] Int. Cl.$^7$ .................................................. B60H 1/32
[52] U.S. Cl. .............................................. 454/121; 165/43
[58] Field of Search ..................................... 454/121, 126, 454/156, 159, 160; 165/42, 43, 103

[56] References Cited

U.S. PATENT DOCUMENTS 4,582,252  4/1986  Ogihara et al. .................... 454/159 X
5,173,078  12/1992  Robin et al. .......................... 454/126
5,476,418  12/1995  Loup ..................................... 454/121

FOREIGN PATENT DOCUMENTS

| | | |
|---|---|---|
| 0 281 457 A1 | 9/1988 | European Pat. Off. . |
| 0 668 177 A1 | 8/1995 | European Pat. Off. . |
| 0 709 241 A1 | 5/1996 | European Pat. Off. . |
| 0 756 955 A2 | 2/1997 | European Pat. Off. . |
| 2 217 440 | 10/1989 | United Kingdom . |
| 2 308 437 | 6/1997 | United Kingdom . |
| WO 93/19946 | 10/1993 | WIPO . |

*Primary Examiner*—Harold Joyce
*Attorney, Agent, or Firm*—Davis and Bujold

[57] ABSTRACT

An air distribution and temperature control module in which the module (51). As arranged as a plug-in unit that can be installed into the vehicle by a simple push in operation.

7 Claims, 6 Drawing Sheets

AIR TEMPERATURE CONTROL AND DISTRIBUTION MODULE

FIELD OF THE INVENTION

This invention relates to motor vehicles and in particular to an air temperature control and distribution module for a motor vehicle.

BACKGROUND OF THE PRESENT INVENTION

It is well known to provide a means for effecting air distribution and temperature control for the passenger compartment of a motor vehicle. Such prior art means comprising of a number of valves mounted within at casing that also houses a blower for the system and possibly various heat exchangers associated with the ventilation system of the motor vehicle.

Such prior art means have the disadvantage that they are custom designed to fit a particular vehicle and it is difficult to adapt them to fit other vehicles.

OBJECTIVE OF THE PRESENT INVENTION

It is an object of this invention to provide an improved air distribution and temperature control means for a motor vehicle.

SUMMARY OF THE INVENTION

According to the invention there is provided an air temperature control and distribution module for use in a passenger compartment ventilation system of a motor vehicle, the module comprising of a housing defining a mixing chamber, a number of inlets in the housing for connection to two or more sources of air and a number of outlets in the housing for connection to a number of air distribution means, the housing supporting a first valve assembly to control the entry of air through said air inlets and a second valve assembly to control and distribute the flow of air into said outlets wherein the module forms a self contained unit that is connectable to the sources of inlet air and the distribution means by being engaged within a socket means attached to part of the structure of the motor vehicle.

The housing may have a first inlet for connection to a source of heated air and a second inlet for connection to a second source of air, a first outlet for connection to a footwell air distribution means, a second outlet for connection to a face vent distribution means and a third outlet for connection to a window demist air distribution means.

The first valve assembly may comprise of a pair of interconnected valve members to admit air from said first and second inlets into said mixing chamber.

The valve members of the first valve assembly may be movable by an actuating means located outside of the housing.

The second valve means may comprise of two interconnected valve members to control the supply of air to said outlets.

The valve members of the second valve assembly may be movable by an actuating means located outside of the housing.

The air temperature control and distribution module may be in the form of a plug-in unit that is engageable with the socket.

BRIEF INTRODUCTION OF THE DRAWINGS OF THE INVENTION

The invention will now be described by way of example with reference to the accompanying drawing of which:

DESCRIPTION OF SPECIFIC EMBODIMENTS OF THE INVENTION

Figure 1:
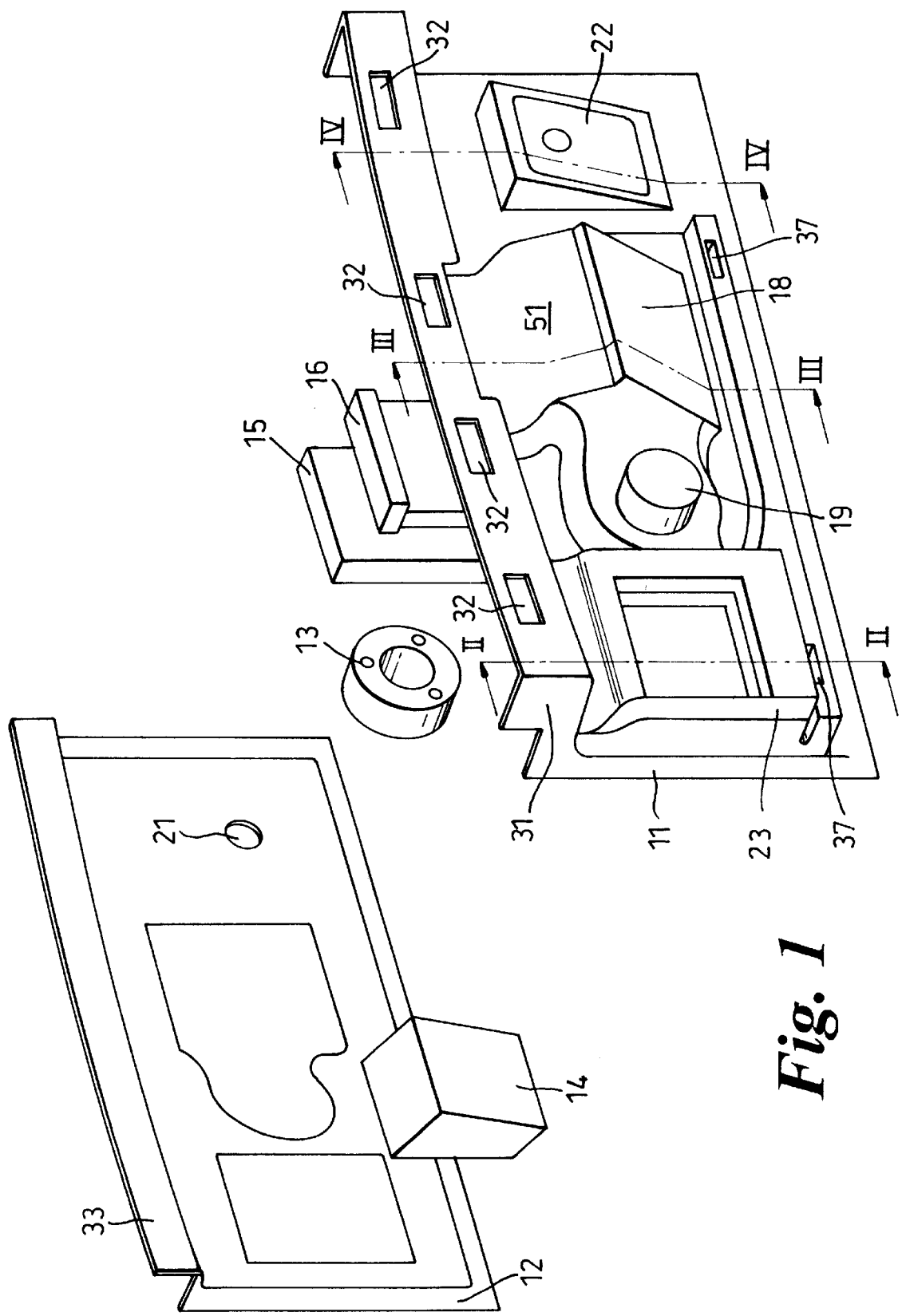
FIG. 1 is an exploded pictorial representation of a firewall assembly for a motor vehicle showing an air temperature control and distribution unit according to the invention.
Figure 2:
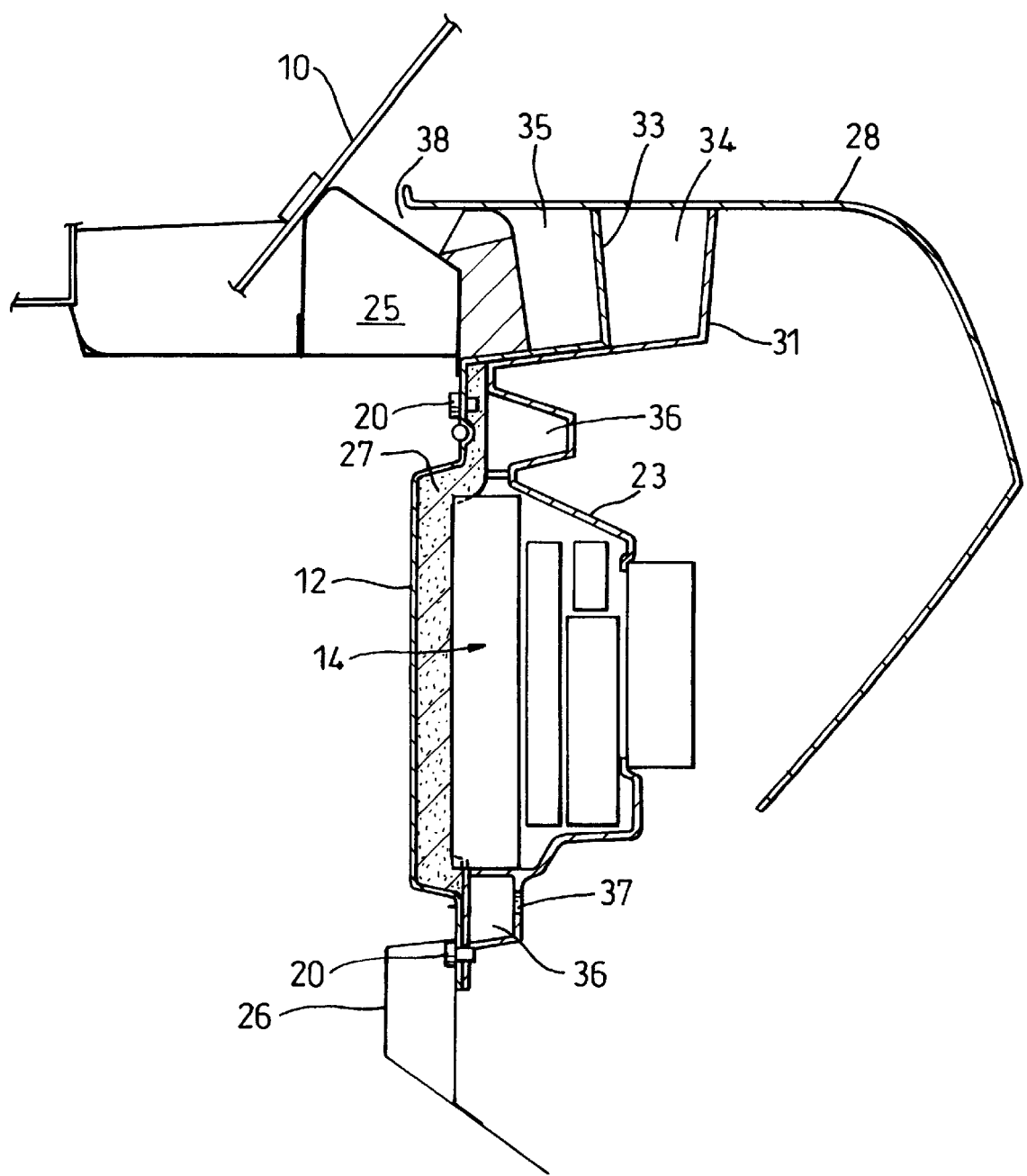
FIG. 2 is a cross-section on the line II—II on FIG. 1.

With reference to FIGS. 1 to 4 there is shown an inner firewall 11, an outer firewall 12 and a number of components of a motor vehicle in the form of a blower fan 13, an electronic control unit 14, an air conditioning evaporator 15, a heater unit 16 and a brake master cylinder unit 24 all of which are supported by the inner and outer firewalls 11, 12. The firewall assembly formed by the inner and outer firewalls 11, 12 therefore provides a support for a number of components of the motor vehicle that can be attached to one or other of the inner and outer firewalls 11, 12 before the firewall assembly is fitted into the motor vehicle to provide a separator between an engine compartment of the motor vehicle and a passenger compartment of the motor vehicle.

The inner and outer firewalls 11, 12 when fitted and secured together define an internal cavity. A noise and vibration absorbing material 27 is bonded, sprayed or moulded to the outer firewall 12 during manufacture of the outer firewall 12.

The inner firewall 11 is contoured to define a receptacle for a combined temperature control and air distribution unit 51 and also defines a housing 23 for the electronic control unit 14, a casing 19 for the blower unit 13, a casing 18 for an interior air temperature unit of the motor vehicle in the form of the evaporator 15 and the heater 16, and an integral pedal box support 22.

The inner and outer firewalls 11, 12 when fastened together define a number of air supply ducts 34, 35, 36 that extend from the receptacle for the combined temperature control and distribution unit 51 to various outlets 32, 37, 38 in the interior of the passenger compartment of the motor vehicle.

A face vent duct 34 is formed by a first wall member 31 formed as part of the inner firewall 11 and a second wall member 33 formed as part of the outer firewall 12. The second wall member 33 also forms a side wall to a demist duct arranged to supply air to a number of demist outlets 38 which are located in close proximity to a windscreen 10 of the motor vehicle. A footwell duct 36 is arranged to supply air to a number of floor outlets 37 and also to the housing 23 for the electronic control unit 14.

Figure 3:
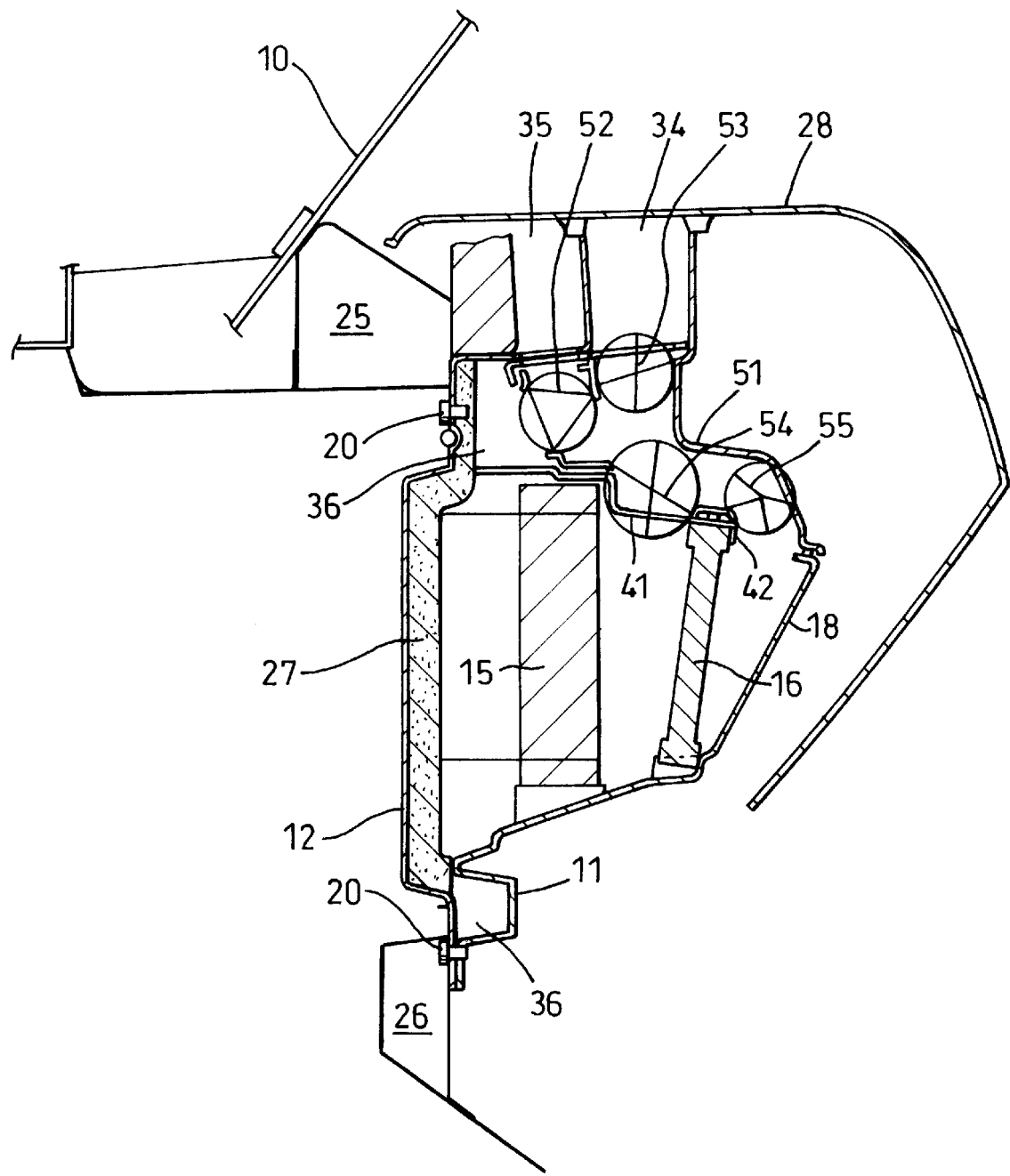
FIG. 3 is a cross-section on the line III—III on FIG. 1.

With particular reference to FIG. 3 it can be seen that the contour of the inner firewall 11 is such as to form a casing 18 for an interior air temperature unit of the motor vehicle. The interior air temperature unit comprising of an evaporator unit 15 forming part of an air conditioning circuit and a heater unit 16 forming part of a heater circuit of the motor vehicle.

The air from the air temperature unit enters a combined temperature control and air distribution unit 51 via two apertures 41 and 42 in the upper surface of the casing 18.

To control the flow of air from the air temperature unit into the combined temperature control and distribution unit 15 first and second temperature control valves 54, 55 are provided in the combined temperature control and distribution unit 51. The effect of the first and second temperature control valves is to blend cold air entering through the aperture 41 with warm air entering through the aperture 42.

The air after mixing then flows through the combined temperature control and distribution unit and is distributed via first and second distribution valves 52, 53. The first distribution valve is used to control and distribute the flow of air from the combined temperature control and distribution unit 51 into both the demist duct 35 and the footwell duct 36. The second distribution valve 53 is used to control the flow of air into the face vent duct 34.

Figure 5:
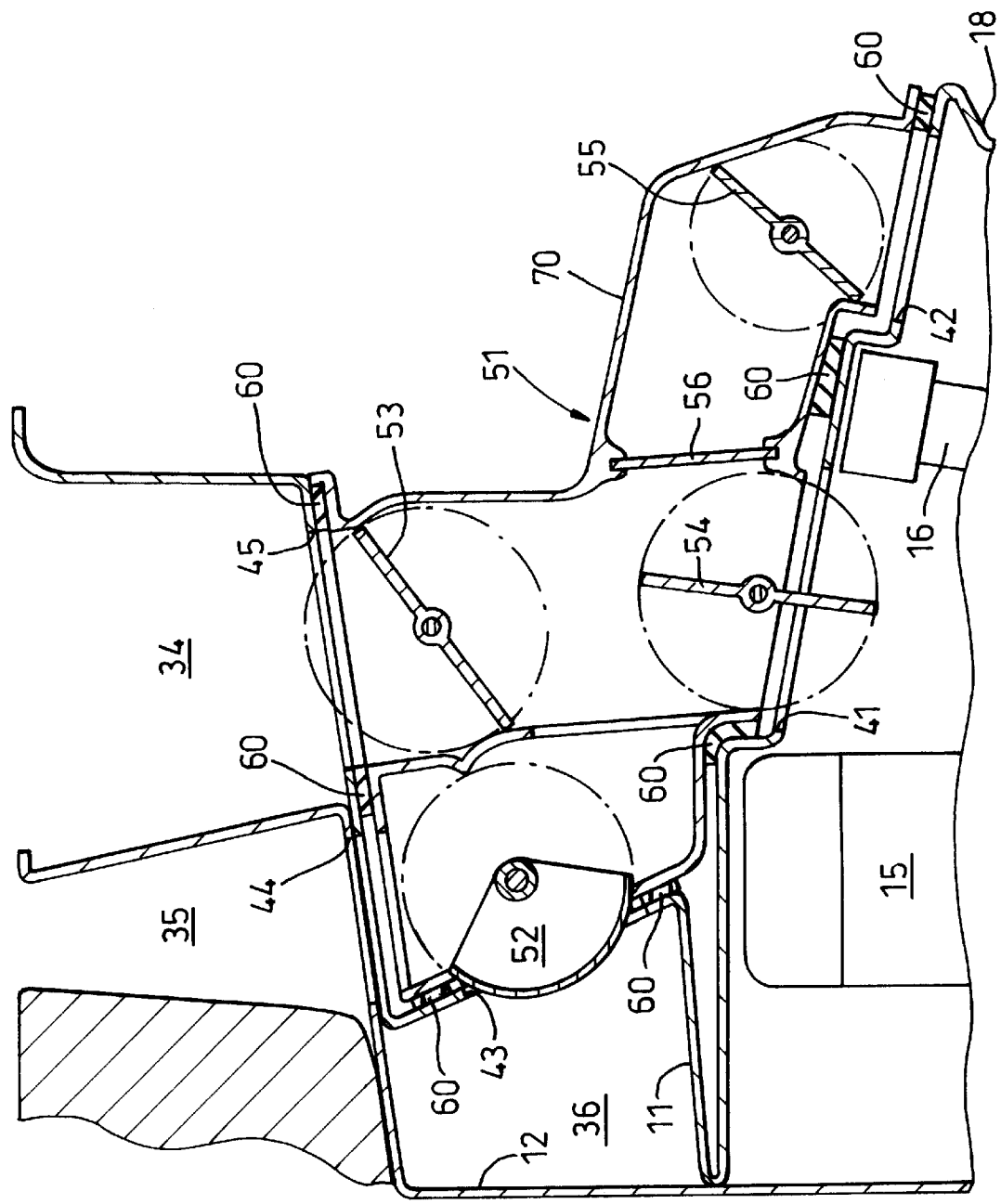
FIG. 5 is an enlarged cross-sectional view of a combined temperature control and air distribution unit according to the invention.
Figure 6:
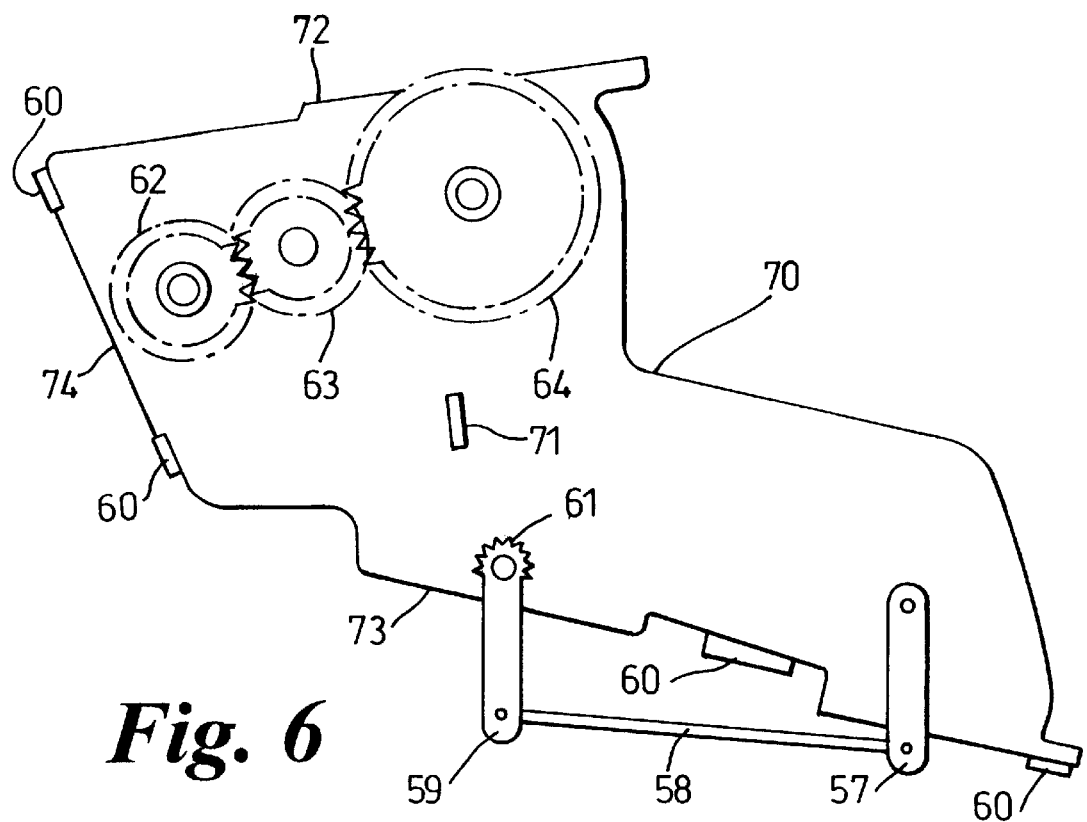
FIG. 6 is an end view of the combined temperature control and air distribution unit shown in FIG. 5.

The air temperature control and distribution unit 51 is shown in greater detail in FIGS. 5 and 6. The unit 51 comprises of a plastic housing 70 in which are rotatably mounted the valves 52, 53, 54 and 55.

The housing has an upper surface 72 for sealing engagement with part of the receptacle in the inner firewall 11, a lower surface 73 for sealing engagement with part of the receptacle in the inner firewall 11 and a rear surface 74 for sealing engagement with part of the receptacle in the inner firewall 11. To enable the unit 51 to be easily fitted and sealed to the receptacle the upper and lower surfaces 72 and 73 are inclined with respect to one another as are the complimentary surfaces of the receptacle in the inner firewall 11. Therefore upon insertion of the unit 51 into the receptacle the unit 51 does not slide across the upper and lower surfaces of the receptacle until it is virtually fully engaged and then acts as a wedge compressing seals 60 located on the upper and lower surfaces 72 and 73. This arrangement provides a plug and socket arrangement in which the unit 51 forms the plug with the receptacle in the firewall 11 forming a socket and provides a quick but effective means of operationally connecting the unit 51 with the distribution means for the air.

The first temperature control valve 54 is in the form of a flap valve and the second temperature control valve 55 is in the form of a further flap valve.

The two flap valves 54 and 55 are interconnected by means of a linkage comprising of two levers 57, 59 joined by an elongate rod 58. The lever 59 is connected to the flap valve 54 and has a gear form 61 on one end thereof for engagement with a servo motor (not shown). Movement of the lever 59 will produce a corresponding movement of the lever 57 and therefore rotation of the flap valve 55 is interlinked with the rotation of the flap valve 54.

As shown in FIG. 5 the flap valves 54, 55 are in a position to provide maximum cooling so that the flap valve 55 closes off the aperture 42 and the flap valve 54 opens aperture 41. Rotation of the flap valve 54 in a counter clockwise direction for approximately 800 will cause it to close off the aperture 41 but will result in the flap valve 55 opening the aperture 42. In this position maximum heating is provided.

Between these two positions the flow of air through apertures 41 and 42 will be regulated by the flap valves 54 and 55 and the flow through the aperture 42 will pass through a straightening baffle 56 before mixing with the cold air entering through aperture 41.

The mixed air then flows into the distribution part of the combined temperature control and distribution unit 51 in a mixed state. The distribution part of the combined temperature control and distribution unit 51 comprises of the first and second distribution valves 52 and 53. The first distribution valve is in the form of a quadrant valve 52 which is rotatable through 120° from a first position in which it prevents the egress of air through an aperture 43 into the footwell duct 36 to a second position in which it prevents the flow of air through an aperture 44 into the demist duct 35 and in between these positions the valve 52 allows the air to flow to both of the apertures 43, 44.

The second distribution valve in the form of a flap valve 53 controls the flow of air through an aperture 45 into the face vent duct 34. The second distribution valve is rotatable through 60° from a position where it closes off the aperture 45 to a position where it provides a minimal restriction to flow through the aperture 45.

The first and second distribution valves 52 and 53 are interconnected by means of a gear system comprising of a first distribution valve gear wheel 62 a second distribution valve gear wheel 64 and an idler gear 63. The idler gear 63 is driven by means of a servo means (not shown) to provide rotation of the first and second distribution valves 52 and 53.

The combined temperature control and distribution unit 51 is a self-contained unit and is sealed to the receptacle formed by the inner firewall 11 by means of a number of seals 60 and is held in place by a couple of threaded fasteners (not shown) engaged with tabs 71 moulded as part of the plastic housing 70 of the combined temperature control and distribution unit.

Figure 4:
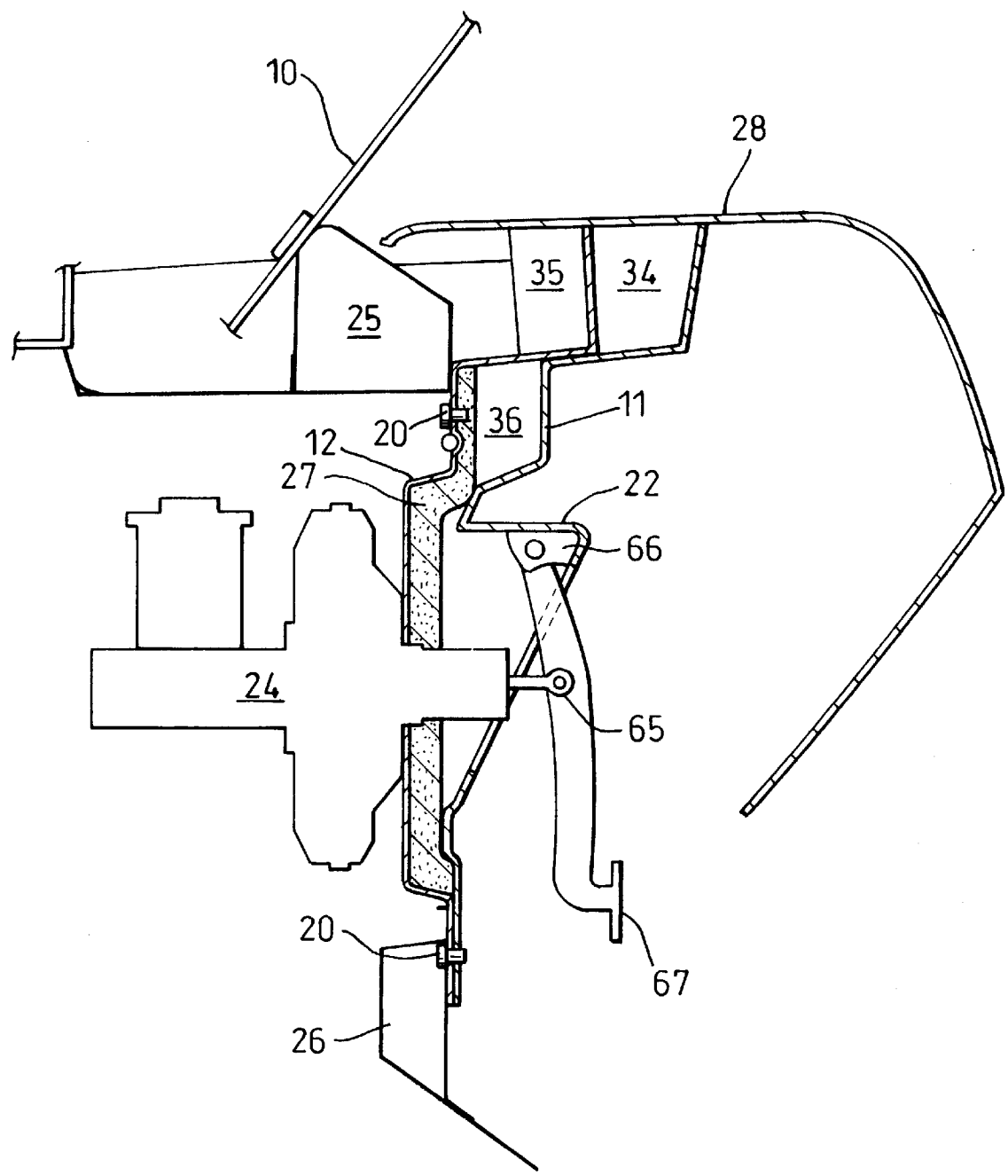
FIG. 4 is a cross-section on the line IV—IV on FIG. 1.

With particular reference to FIG. 4 there is shown a combined brake master cylinder and servo 24 attached to the outer firewall 12. The master cylinder and servo 24 is operable by means of a push rod 65 connected to a brake pedal 67. The brake pedal 67 being pivotally connected to the pedal box support 22 by means of a pivot pin 66.

The inner and outer firewalls 11, 12 are joined together at a number of points by adhesive bonding and then the entire firewall assembly is fastened to structural members of the motor vehicle in the form of upper and lower box sections 25 and 26 by means of bolts 20.

Figure 7:
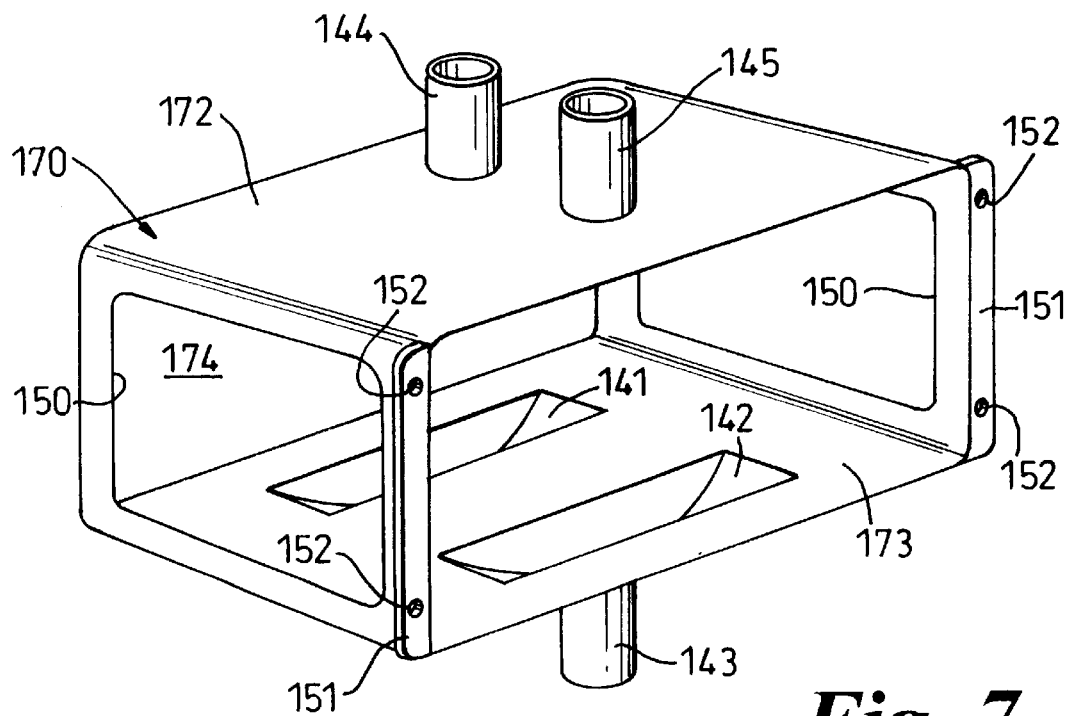
FIG. 7 is a pictorial representation of a connector for use with a module according to the invention.

Although the invention has thus far been described with reference to an arrangement in which the socket part is made as an integral part of a firewall of the vehicle it is not so limited and in FIG. 7 there is shown a receptacle in the form of a plastic housing 170 for use with a temperature control and distribution unit according to the invention. The housing 170 has an upper surface 172 and a lower surface 173 which are not parallel but taper towards the rear surface 174. In each side of the housing 170 an aperture 150 is formed to provide access in use to the actuating means (61, 63 on FIG. 6) of the unit 51.

On the upper surface 172 two outlet pipes 144, 145 extend therefrom for attachment respectively to demist and face vent supply ducts. Two apertures 141, 142 are formed in the lower surface 173 for connection to sources of hot and cold air from an air-conditioning unit (not shown). A pipe 143 is arranged to extend from the aperture 142 to provide a means of connecting the housing to the source of heated air and a second pipe (not shown) extends from the aperture 141 to provide a means of connecting the housing to the source of cool air.

The housing 170 is attached to part of the structure of the motor vehicle by means of threaded fasteners using holes 152 formed in fixing flanges 151.

What we claim is:

1. An air temperature control and distribution module of a motor vehicle for use in a passenger compartment ventilation system, the module comprising a housing defining a mixing chamber, a first inlet in the housing for connection to a source of heated air, a second inlet in the housing for connection to a second source of air, a first outlet in the housing for connection to a footwell air distribution means, a second outlet in the housing for connection to a face vent distribution means and a third outlet in the housing for connection to a window demist air distribution means, the housing supporting a first valve assembly to control entry of air through said inlets and a second valve assembly to control and distribute the flow of air through said outlets wherein the module forms a self contained unit that is connectable to the sources of inlet air and the distribution means by being engaged within a socket means attached to part of the structure of the motor vehicle.

2. The module according to claim 1, wherein the comprising assembling defines a pair of interconnected valve members to admit air from said first and second inlets into the mixing chamber.

3. The module according to claim 2, wherein the valve members of the first valve assembly are movable by an actuating means located out side of the housing.

4. The module according to claim 1, wherein the second valve means comprises two interconnected valve members to control the supply of air through said outlets.

5. The module according to claim 4, wherein the valve members of the second valve assembly are movable by an actuating means located outside of the housing.

6. The module according to claim 1, wherein the air distribution and temperature control module is in the form of a plug-in unit that is engageable with the socket means.

7. An air temperature control and distribution module of a motor vehicle for use in a passenger compartment ventilation system, the module comprising a housing defining a mixing chamber, a first inlet in the housing for connection to a source of heated air, a second inlet in the housing for connection to a second source of air, a first outlet in the housing for connection to a footwell air distribution mechanism, a second outlet in the housing for connection to a face vent distribution mechanism and a third outlet in the housing for connection to a window demist air distribution mechanism, the housing supporting a first valve assembly to control entry of air through said inlets and a second valve assembly to control and distribute the flow of air through said outlets wherein the module forms a self contained unit that is connectable to the sources of inlet air and the distribution mechanism by being engaged within a socket mechanism attached to part of the structure of the motor vehicle.

* * * * *